United States Patent
Maruya et al.

(10) Patent No.: US 6,993,786 B1
(45) Date of Patent: Jan. 31, 2006

(54) CLIENT/SERVER MULTIMEDIA PRESENTATION SYSTEM

(75) Inventors: Kensuke Maruya, Tokyo (JP); Toshio Oka, Yokohama (JP); Akino Inoue, Tokyo (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/336,699

(22) Filed: Jun. 21, 1999

(30) Foreign Application Priority Data

Jun. 26, 1998 (JP) ............................................ 10-180269

(51) Int. Cl.
*H04N 7/173* (2006.01)

(52) U.S. Cl. .............................. 725/88; 725/96; 725/90; 725/98; 725/102; 725/50; 725/115; 725/145; 386/46; 386/83

(58) Field of Classification Search ................... 725/88, 725/96, 102, 98, 50, 90, 114, 145, 115; 386/46, 386/83

See application file for complete search history.

(56) References Cited

U.S. PATENT DOCUMENTS

| 5,418,713 A | 5/1995 | Allen |
| 5,583,561 A | 12/1996 | Baker et al. |
| 5,594,911 A | 1/1997 | Cruz et al. |
| 5,621,660 A * | 4/1997 | Chaddha et al. ............ 709/247 |
| 5,646,676 A | 7/1997 | Dewkett et al. |
| 5,659,539 A | 8/1997 | Porter et al. |
| 5,720,037 A * | 2/1998 | Biliris et al. ................... 725/92 |
| 5,771,335 A * | 6/1998 | Lee ............................. 386/111 |
| 5,852,565 A * | 12/1998 | Demos ....................... 708/203 |
| 6,002,440 A * | 12/1999 | Dalby et al. ........... 375/240.12 |
| 6,014,694 A * | 1/2000 | Aharoni et al. ............. 709/219 |
| 6,172,672 B1 * | 1/2001 | Ramasubramanian et al. ... 345/720 |
| 6,233,017 B1 * | 5/2001 | Chaddha ................. 375/240.12 |
| 6,430,354 B1 * | 8/2002 | Watanabe .................... 386/46 |
| 6,496,980 B1 * | 12/2002 | Tillman et al. ............... 725/90 |

* cited by examiner

*Primary Examiner*—Chris Grant
*Assistant Examiner*—Jason Salce
(74) *Attorney, Agent, or Firm*—Michael G. Gilman

(57) ABSTRACT

A method of presenting, at a client terminal, a video program stored in a server linked with the client terminal via transmission path of a limited transmission band width. Each frame of the video program comprises a basic data portion and at least one level of quality supplement data portions. In the method, in response to one of play control commands from a user, the client terminal determines a start position in the video program according to the issued play control command. The play control commands includes a play, a stop, a head search, a jump forward and a jump backward command. In response to the issued play command, the terminal obtains and uses the basic data portions for playing the video program. In response to the stop command, the terminal obtains the quality supplement data portions for the last displayed frame and uses them for displaying a quality-enhanced version of the last displayed frame.

13 Claims, 15 Drawing Sheets

FIG. 2

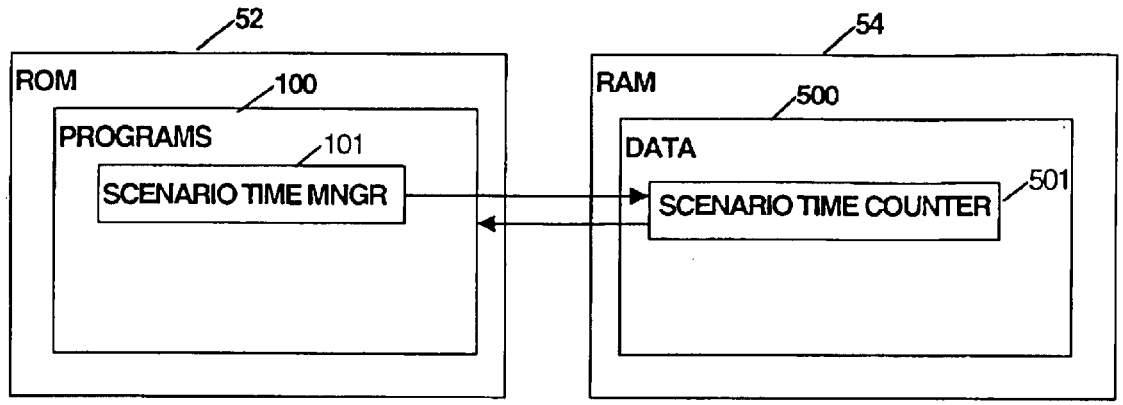

FIG. 3

CONTROL SWITCHES  70

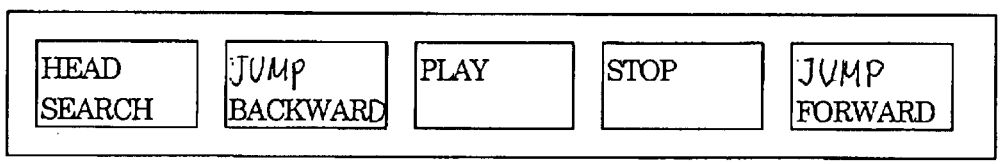

FIG. 4

| OPERATED SWITCHES (or ISSUED COMMAND) | THE VALUE (Ct) OF SCENARIO TIME COUNTER |
|---|---|
| PLAY | Ct+1   FOR EVERY FRAME PERIOD T DURING EXECUTION |
| JUMP FORWARD (JF) | Ct+Cj   AFTER THE COMMAND EXECUTION |
| JUMP BACKWARD (JB) | Ct−Cj   AFTER THE COMMAND EXECUTION |
| HEAD SEARCH (HS) | 0   AFTER THE COMMAND EXECUTION |
| STOP | Ct   AFTER THE COMMAND EXECUTION |

(Cj IS A PREDETERMINED LEAP (OR JUMP) DISTANCE FOR FORWARD AND BACKWARD OPERATIONS)

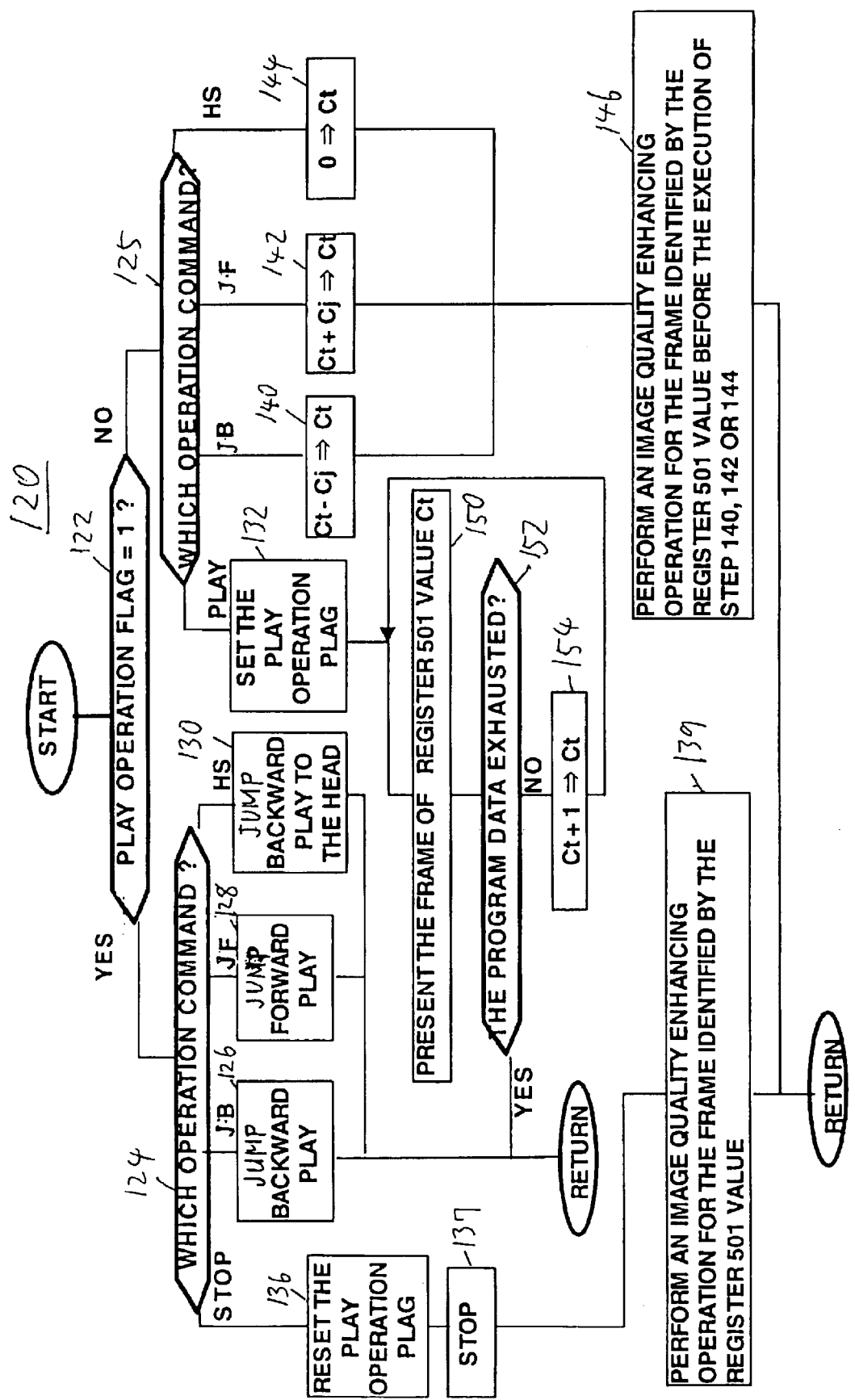

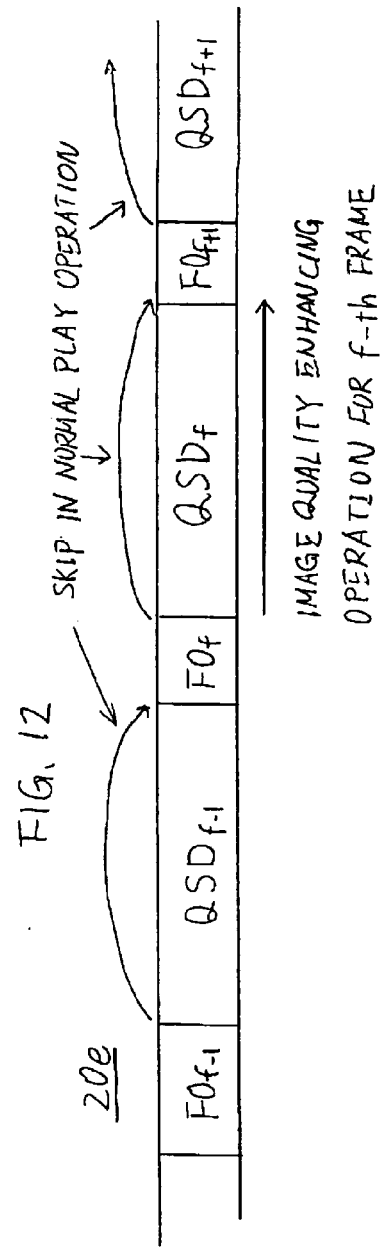
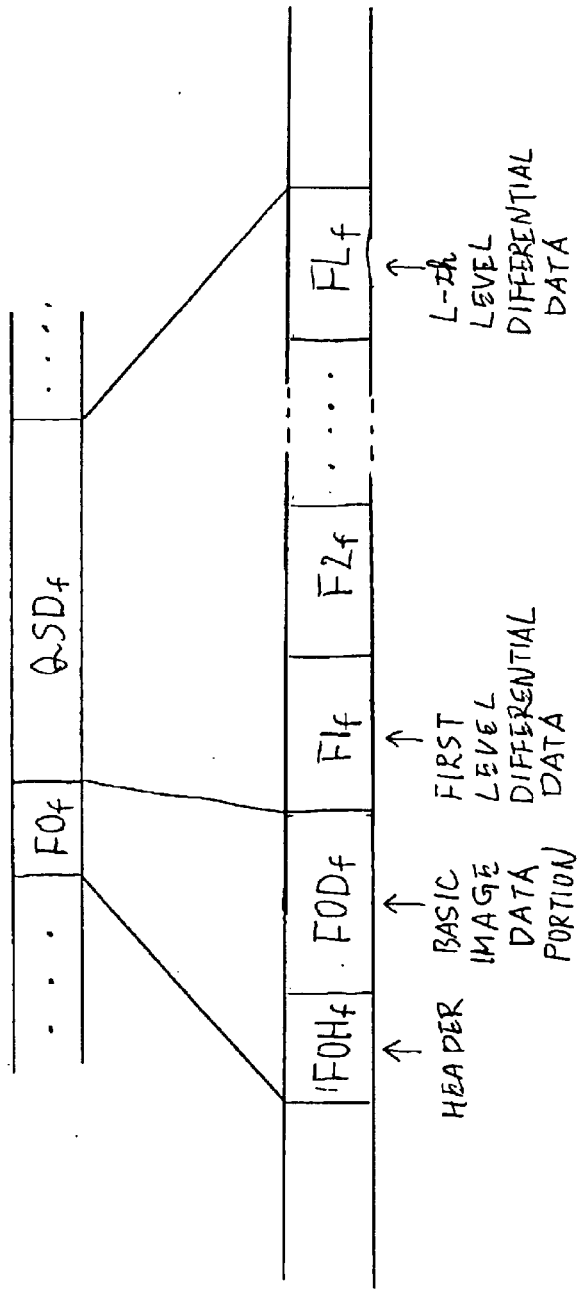

FIG. 16

SCENARIO DATA TABLE

| OBJECT ID | KIND OF OBJECT | DISPLAY POSITION | DISPLAY SIZE | PRESENTATION START TIME (Ct VALUE = SCt) | PRESENTATION END TIME (Ct VALUE) |
|---|---|---|---|---|---|
| 001 | STILL | X=0, Y=0 | 800x600 | 0:00 (0) | 3:25 (369000) |
| 002 | VIDEO | X=100, Y=100 | 400x300 | 0:00 (0) | 3:25 (369000) |
| 003 | TEXT | X=20, Y=20 | 400x50 | 0:00 (0) | 1:00 (108000) |
| 004 | TEXT | X=200, Y=500 | 500x50 | 1:00 (108000) | 3:00 (324000) |
| 005 | STILL | X=600, Y=150 | 150x200 | 1:00 (108000) | 2:00 (216000) |
| 006 | STILL | X=600, Y=450 | 100x100 | 2:30 (270000) | 3:15 (351000) |

FIG. 17

ACTIBE OBJECT TABLE

| Ct VALUE | ACTIVE OBJECTS |
|---|---|
| 0 | 001, 002, 003 |
| 108000 | 001, 002, 004, 005 |
| 216000 | 001, 002, 004 |
| 270000 | 001, 002, 004, 006 |
| 324000 | 001, 002, 006 |
| 351000 | 001, 002 |
| 369000 | |

FIG. 23

- OBJECT ID
- KIND OF ONJECT
- DISPLAY POSITION
- DISPLAY SIZE
- PRESENTATION START TIME
- PRESENTATION END TIME
- LOADING PRIORITY CODE (or VERIABLE-QUALITY FLAG)

- OBJECT ID
- LOAD FLAG

CLIENT/SERVER MULTIMEDIA PRESENTATION SYSTEM

BACKGROUND OF THE INVENTION

1. Field of the Invention

The invention relates to a client/server system in which a client terminal connected with a server through a transmission path of a limited bandwidth plays a multimedia program which is stored in the server and is comprised of multimedia objects such as moving pictures, still pictures, sounds and texts while reading the objects in real time from the server.

2. Description of the Prior Art

In such a system, a user of a client terminal is permitted to select one of a plurality of programs and to enter commands such as a play, a stop, a head search, a jump forward and a jump backward for the selected program. During a play operation, the server reads data of a specified program stored in a storage device and transmits the read data to the client terminal. Then, the client terminal displays the received data. However, once one of the stop, the head search, a jump forward and a jump backward command is executed, no data is transmitted from the server to the client terminal till the play command is executed.

The transmission rate of the transmission path between the server and each terminal is limited, i.e., the quantity of data transmitted for a certain period of time is limited. For this reason, in order to enable each client terminal to play a program whose data is stored in the server while having the program data transmitted from the server, video data of each program is stored in the server such that the bit rate (or the quantity of data reproduced or played per second) of video data of each program does not exceed the transmission rate of the transmission paths.

If the transmission paths between the server and the client terminals are considerably low as in case of ordinary telephone lines, it is necessary to reduce the frame rate, the resolution and/or the frame size, which degrades the picture quality of video objects.

It is an object of the invention to provide a video-on-demand system that enhances the quality of image by using the period of a play stoppage.

SUMMARY OF THE INVENTION

According to an aspect of the invention, a method of presenting, at a client terminal, a video program stored in a server linked with the client terminal via transmission path of a limited band width is provided. Each frame of the video program comprises a basic data portion and at least one level of quality supplement data portions. In the method, in response to one of play control commands from a user, the client terminal determines a start (or play) position in the video program according to the issued play control command. The play control commands includes a play, a stop, a head search, a jump forward and a jump backward command. In response to the issued play command, the terminal obtains and uses the basic data portions for playing the video program. In response to the stop command, the terminal obtains and uses the at least one level of quality supplement data portions of a last displayed frame for displaying a quality-enhanced version of the last displayed frame.

According to another aspect of the invention, a method of presenting, at a client terminal, a multimedia program stored in a server is provided. The multimedia program includes a video object. Each frame of the video object comprises a basic data portion and at least one level of detailed data portions. In this method, in response to one of play control commands from a user, the terminal determines a time count in the multimedia program according to the issued play control command. The play control commands include a play, a stop, a head search, a jump forward and a jump backward command. In response to one of the head search, the jump forward and the jump backward commands issued during a stop period, the terminal determines whether there is a video object to be displayed at the time count in the multimedia program. In the event there is the video object to be displayed at the time count in the multimedia program, the terminal obtains at least one level of quality supplement data portions for a first frame to be displayed in a next play operation for displaying a quality-enhanced version of the first frame to be displayed.

If a stop command is issued, a test is responsively made to see if there is multimedia objects which are other than video objects and each comprise basic data and quality supplement data and which are to be displayed at said time count in said multimedia program. If so, then for each of said found multimedia objects, the terminal obtains the quality supplement data for displaying a quality-enhanced version of each object.

Alternatively, in response to the stop command, a test is made to see if there is (or are) multimedia objects which are other than video objects and each comprise basic data and quality supplement data and which are to be displayed later. If so, the terminal tries to obtain the basic data for as many of the found multimedia objects as possible in advance.

According to another aspect of the invention, a terminal for presenting a video program stored in a remote server connected therewith via band-limited transmission path is provided. Each frame of the video program comprises a basic data portion and at least one level of quality supplement data portions. The terminal comprises means, responsive to one of play control commands from a user, for determining a start position in the video program according to the issued play control command. The play control command includes a play, a stop, a head search, a jump forward and a jump backward command. The terminal includes means, responsive to the play command from the user, for obtaining and using said basic data portions for playing said video program; and means, responsive to the stop command, for obtaining and using at least one level of quality supplement data portions of a last displayed frame for displaying a quality-enhanced version of the last displayed frame.

BRIEF DESCRIPTION OF THE DRAWING

The features and advantages of the present invention will be apparent from the following description of an exemplary embodiment of the invention and the accompanying drawing, in which:

FIG. 2 is a schematic diagram showing the contents of the ROM 52 and the RAM;

FIG. 3 is a diagram showing exemplary presentation control buttons included in the control switches 70 of FIG. 1;

FIG. 4 is a table for describing how the scenario time manager 101 sets the value Ct of the scenario time register 501 in response to the executed presentation control command;

FIG. 6 is a flowchart showing an exemplary operation of an interrupt subroutine called from a main program in response to an interrupt caused by a pressing of one of the presentation control buttons of FIG. 3 after one of the available programs stored in the mass storage 20 is specified by the user at the client terminal 3;

FIG. 12 is a diagram showing a third storing scheme 20e of storing a video object on a disc storage device;

FIG. 13 is a diagram showing a data structure obtained when a progressive JPEG video object is stored in the third storing scheme 20e as shown in FIG. 12;

FIG. 16 is a diagram showing an exemplary scenario data table of a multimedia program available in a multimedia-on-demand system according to a second illustrative embodiment of the invention:

FIG. 17 is a diagram showing an exemplary active object table created from the scenario data table of FIG. 16;

FIG. 23 is a diagram showing an exemplary structure of a scenario data table according to the third embodiment of the invention; and FIG. 24 is a diagram showing an exemplary arrangement of a load flag storage location.

Throughout the drawing, the same elements when shown in more than one figure are designated by the same reference numerals.

DETAILED DESCRIPTION OF THE PREFERRED EMBODIMENTS

Figure 1:
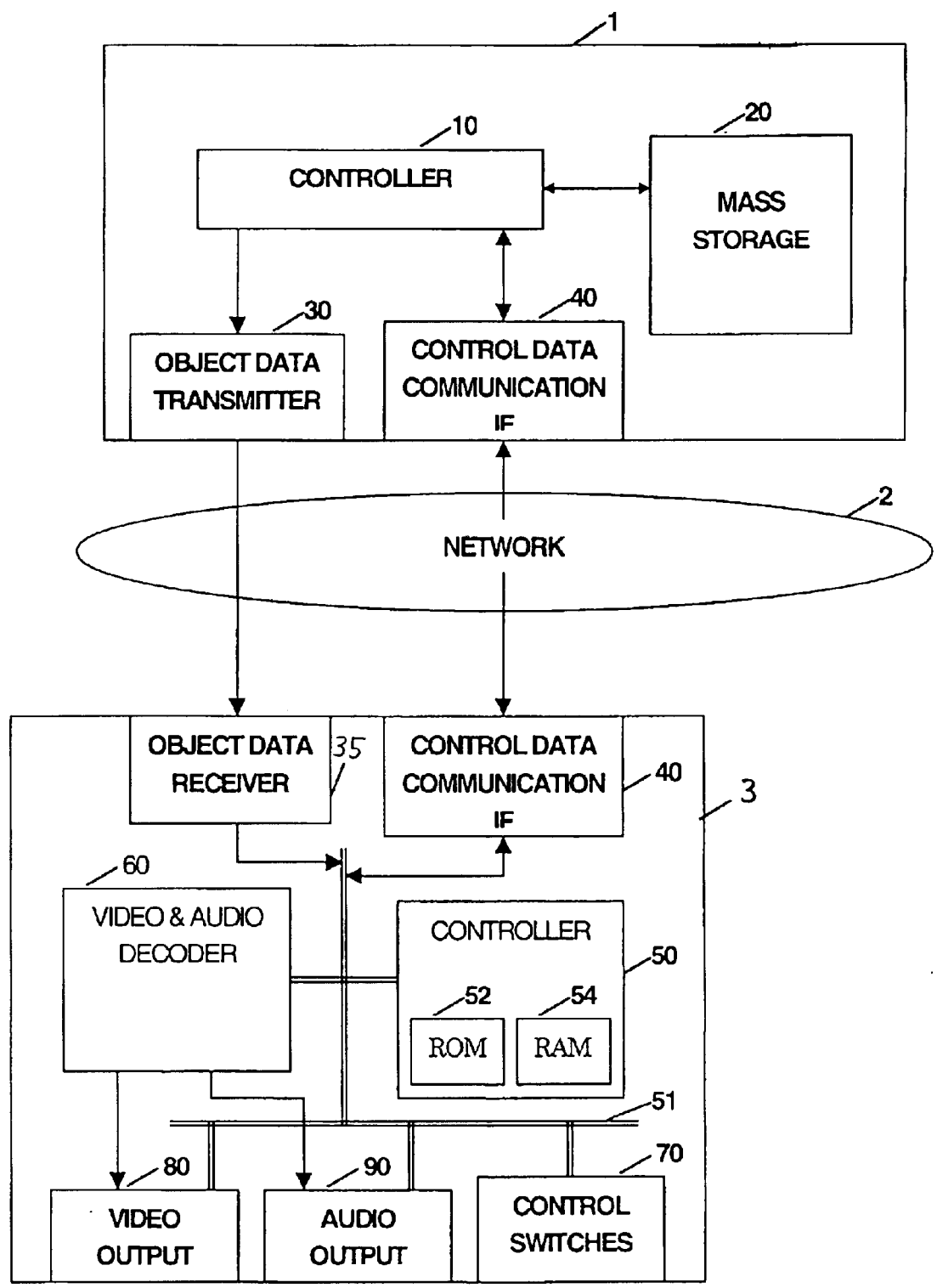
FIG. 1 is a schematic block diagram showing an arrangement of a multimedia-on-demand system that can embody the present invention in various forms.

FIG. 1 is a schematic block diagram showing an arrangement of a multimedia-on-demand system that can embody the present invention in various forms. In FIG. 1, double lines indicate bus lines. The multimedia-on-demand system comprises a server 1 that stores and serves multimedia programs, at least one client terminal 3 that plays one of the multimedia programs, and a network 2 for connecting the server 1 and the client terminals 3.

The server 1 comprises a controller 10, a mass storage 20 for storing the multimedia programs, an object data transmitter 30 for transmitting object data constituting a multimedia program and a control data communication interface (IF) 40 for communicating control data with each client terminal 3. The client terminal 3 comprises an object data receiver 35 for receiving object data transmitted from the server 1; a control data communication IF 40 for communicating the control data with the server 1; a controller 50 for controlling the operation of the terminal 3; a video and audio decoder 60 for decoding video and audio object data into video and audio output signals; a video output portion 80 for providing a video output according to the video signal from the decoder 60 and the image data from the controller 50; a audio output portion 90 for providing an audio output according to the audio signal from the decoder 60 and the audio data from the controller 50; and control switches 70 that permit the user to specify a desired one of the multimedia programs stored in the mass storage 20 and to enter a play, stop, jump forward, jump backward and head search commands. The controller 50 includes a read only memory (ROM) 52 and a random access memory (RAM) 54. The elements 35, 40, 50, 60, 70, 80 and 90 are interconnected by bus lines 51.

FIG. 2 is a schematic diagram showing the contents of the ROM 52 and the RAM. In FIG. 1, the ROM 52 stores programs 100 necessary for the operation of the controller 50. The RAM 54 stores various data 500 necessary for the operation of the controller 50. The programs 100 include a scenario time manager 101, which sets the value (Ct) of a scenario time register 501 in the RAM 54 in a play operation of a multimedia program such that the current scenario time or the current position in the multimedia program is given by T*Ct, where T is a frame period of the video objects.

The control switches 70 include presentation control buttons for head search (HS), jump forward (JF), play, stop, jump backward (JB) operations as shown in FIG. 3. FIG. 4 shows a table for describing how the scenario time manager 101 sets the value Ct of the scenario time register 501 in response to the executed presentation control command. In FIG. 4, if a play command is issued, the scenario time manger 101 increments the value Ct of the scenario time register 501 for every frame period T as long as the play command is active. If a jump forward, a jump backward or a head search is issued, the scenario time manger 101 sets the scenario time register value Ct to Ct+Cj, Ct−Cj or 0, respectively. Cj is a predetermined jump distance for use in the JF and JB operations. In case of a stop command, the scenario time manger 101 does nothing, i.e., the value Ct remains unchanged.

Each of the multimedia programs generally comprises video objects, still picture objects, audio objects and/or text objects.

Embodiment 1

For the sake of simplicity, it is assumed in a first illustrative embodiment of the invention that the multimedia on-demand system of FIG. 1 is a video-on-demand system, i.e., each of the programs available at each client comprises a video object.

Figure 5:
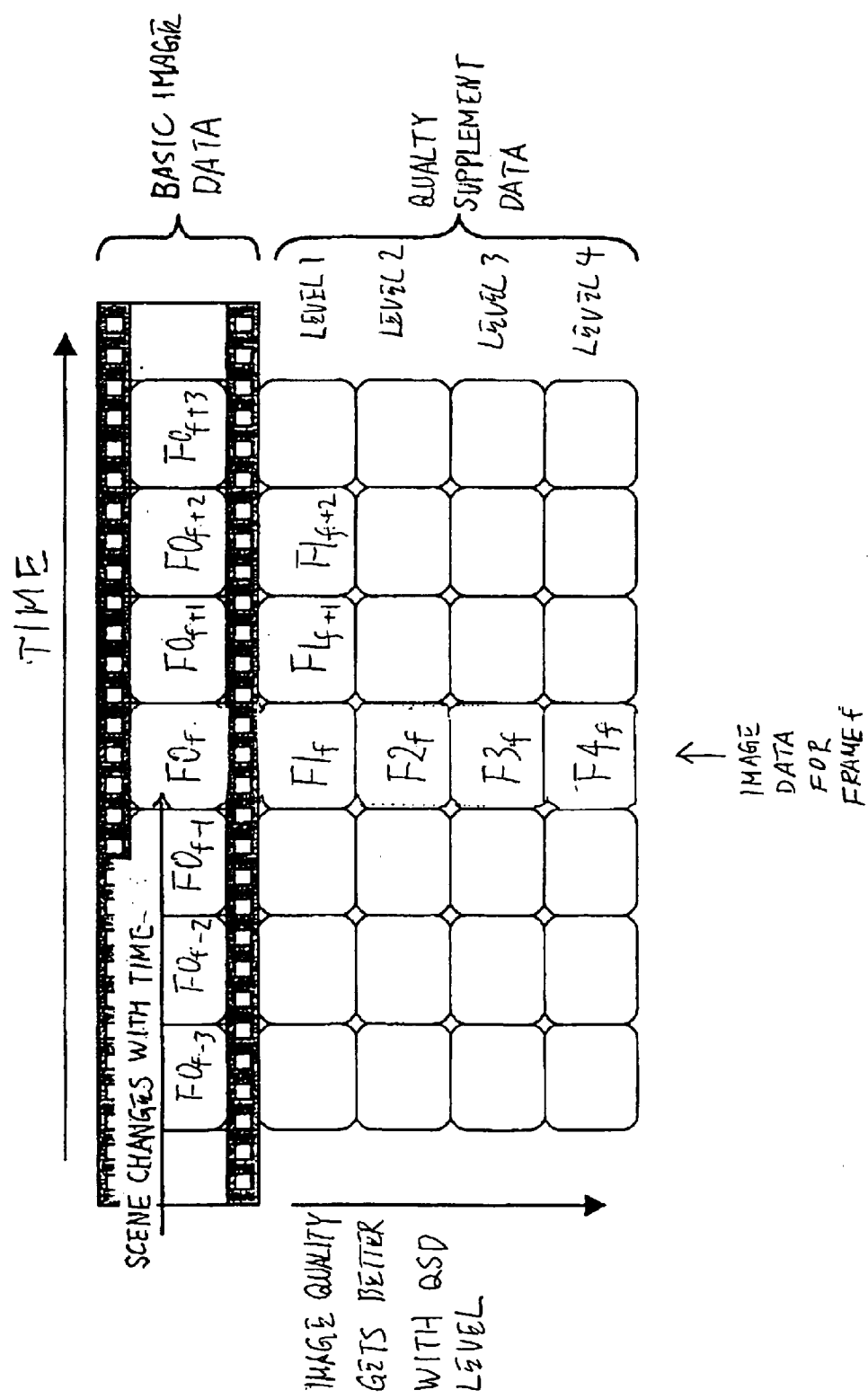
FIG. 5 is a diagram conceptually showing a data structure of a video object stored in the mass storage 20 of FIG. 1.

It is also assumed that the data of the video object stored in the mass storage 20 has a structure as shown in FIG. 5.

Data of each frame of the video object (hereinafter referred to as "each frame data Ff") comprises a basic image data portion F0f and at least one level (e.g., 4 levels in FIG. 5) of quality supplement data portions F1f, F2f, F3f and so on. (f=1, 2, ..., N, where N is the total number of frames of a video object). The suffix f is the frame number of the frame. Zero "0" following "F" in a label given to each data portion indicates that the data portion is the basic image data. A non-zero numeral (1, 2, 3 ...) following 'F' in a label given to each data portion indicates that the data portion is quality supplement data of the level specified by the non-zero numeral. The image quality of the f-th frame becomes better to the best by using not only basic image data F0f but also quality supplement data F1f, F2f, F3f and so on. In the following description, it is assumed that there are 4 levels of quality supplement data portions F1f, F2f, F3f and F4f for each frame.

In the first illustrative embodiment, the client terminal 3 uses only the basic image data $F0_1, F0_2, \ldots, F_N$ (hereinafter referred, en bloc, to like "F0") in a play operation. However, if the terminal 3 detects a stop command in an arbitrary state of operations or detects one of head search (HS), jump forward (JF) and jump backward (JB) commands during a stop state, the terminal 3 performs a image quality enhancing operation on entering a stop state or just after the operation of the detected command by obtaining the quality supplement data F1f, F2f, F3f and F4f for the last displayed frame from the server 1.

Since the presented program is a video object in this example, the scenario time register 501 contains the frame number f, that is, Ct=f.

FIG. 6 is a flowchart showing an operation executed by the controller 50 of the client terminal 3 under the control of an interrupt subroutine called from a main program in response to an interrupt caused by the user at the client terminal 3 pressing one of the presentation control buttons of FIG. 3 after specifying one of the available programs stored in the mass storage 20. In FIG. 6, the controller 50 first makes a test in step 122 to see if a play operation flag (not shown) is logical "1" or indicates that the terminal is in one of the play modes: i.e., a (normal) play, a jump forward (JF) play, a jump backward (JB) play, and a head search (HS) play (or a JB play to the beginning of the program). If so (which means that the terminal 3 is in a play mode), a test is made in step 124 to see which presentation control command has been issued.

If JB, JF or HS command is detected in step 124, then the controller 50 executes a JB play step 126, a JF play step 128 or a HS play step 130, respectively, in a well known manner; and returns to the main program that has invoked this subroutine 120 to resume the play operation that was being executed when this routine 120 was invoked. If the stop command is detected in step 124, the controller 50 resets the play operation flag, i.e., sets the flag logical "0" in step 136; ceases the play mode in step 137; performs an image quality enhancing operation for the frame identified by the value Ct (=f in this example) of the scenario time register 501 in step 139; and ends the operation 120.

Specifically, in step 139, the controller 50 transmits an image quality enhancing instruction and the register 501 value f to the server 1. The controller 10 of the server 1 responsively reads the quality supplement data F1f, F2f, F3f and F4f for the frame identified by the value f from the mass storage 20 and transmits them to the requesting client terminal 3. The terminal 3 responsively adding the received quality supplement data F1f, F2f, F3f and F4f to the basic image data F0f into a high quality frame data. By doing this, the quality of the currently displayed frame becomes better gradually with the receptions of the quality supplement data F1f, F2f, F3f and F4f. After step 146, the controller 50 ends the operation 120.

If the play operation flag is not logical "1" (which means that the terminal 3 is in a stop mode), a test is made in step 125 to see which presentation control command has been issued.

If a play command is detected in step 125, the controller 50 sets the play operation flag logical "1" in step 132; and plays (or reproduces) the current program (the program the user has specified before the controller 50 has entered the operation 120) from the frame identified by the register 501 value Ct in steps 150, 152 and 154. Specifically, the controller 50 presents the frame of the register 501 value Ct in step 150 and checks the value Ct to see if the register value Ct has reached a preset end value in step 152. If not, the controller 50 increments the value Ct in step 154 and goes back to step 150. If the register 501 value Ct has reached the preset end value in step 152, then the controller 50 returns to the main program that has invoked this subroutine 120.

If JB, JF or HS command is detected in step 125, then the controller 50 sets the register 501 value Ct to Ct−Cj, Ct+Cj or 0 in a JB step 140, a JF step 142 or a HS step 144, respectively, as shown in FIG. 4. After step 140, 142 or 144, the controller 50 performs an image quality enhancing operation for the frame identified by the scenario time register 501 value before the execution of step 140, 142 or 144 in step 146. This causes the quality of the currently displayed frame to get better gradually with the receptions of the quality supplement data F1f, F2f, F3f and F4f as described above. The controller 50 ends the operation 120 after step 146.

Some Examples of the Mass Storage 20

Figure 8:
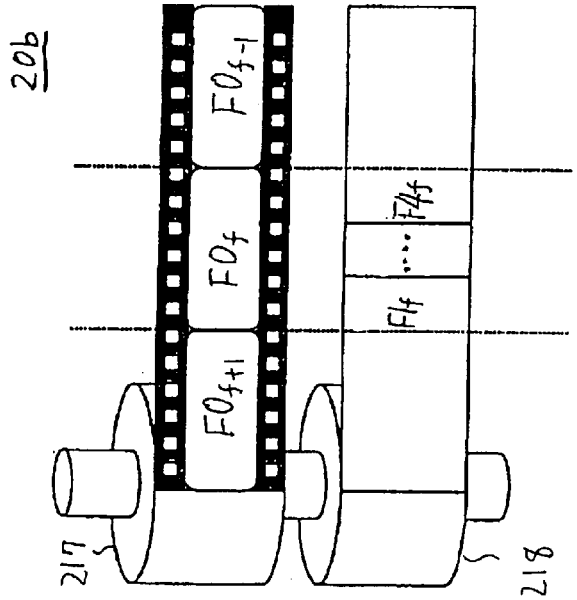
FIGS. 7 and 8 are diagrams conceptually showing arrangements of a first and a second exemplary mass storage 20a and 20b using tape storage devices.
Figure 7:
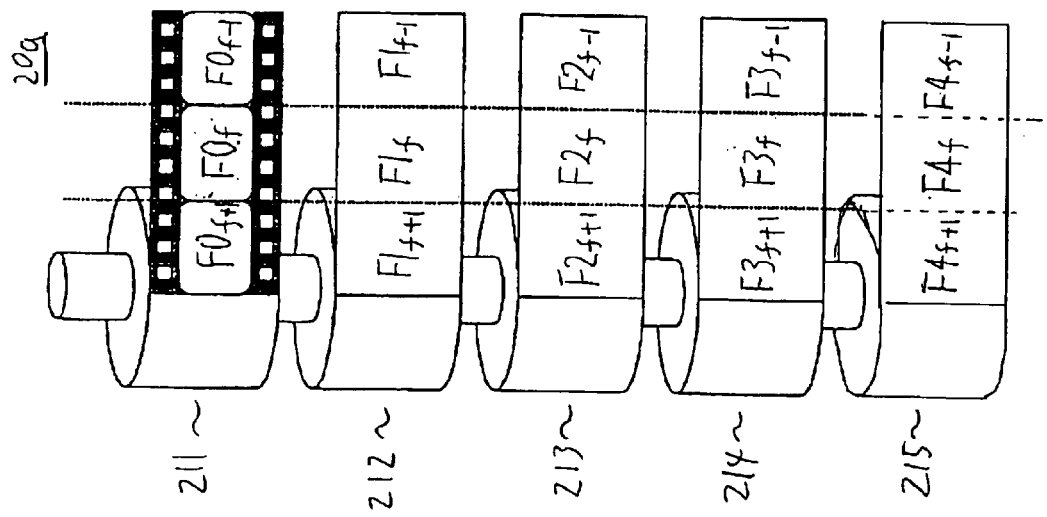

FIGS. 7 and 8 are diagrams conceptually showing arrangements of a first and a second exemplary mass storage 20a and 20b using tape storage devices. The storage 20a comprises five tape storage devices 211 through 215. The tape device 211 stores the basic image data F0. The four tape devices 212 through 215 store the four level quality supplement data F1 through F4, respectively. The basic image data F0f and the corresponding quality supplement data F1f, F2f, F3f and F4f for each frame are recorded on the same tape positions of the five tapes. The five tape storage devices are so arranged that the five reels are independently rotated only in case of image quality enhancing operation and are synchronously rotated otherwise. In an image quality enhancing operation, the tape storage devices 212 through 215 for the quality supplement data F1 through F4 are sequentially read one by one.

The storage 20b comprises two tape storage devices 217 and 218. The tape device 217 stores the basic image data F0. The tape device 218 stores the four level quality supplement data F1 through F4. The quality supplement data F1f, F2f, F3f and F4f for each frame are recorded on the tape position of the tape 218 which corresponds to the position of the tape 217 on which the basic image data F0f for the frame is recorded when the tapes 217 and 218 are rotated synchronously. The two tape devices 217 and 218 are so arranged that the two reels are independently rotated only in case of image quality enhancing operation and are synchronously rotated otherwise. In an image quality enhancing operation, the tape storage device 218 portion for the quality supplement data F1f through F4f are sequentially read.

Figure 9:
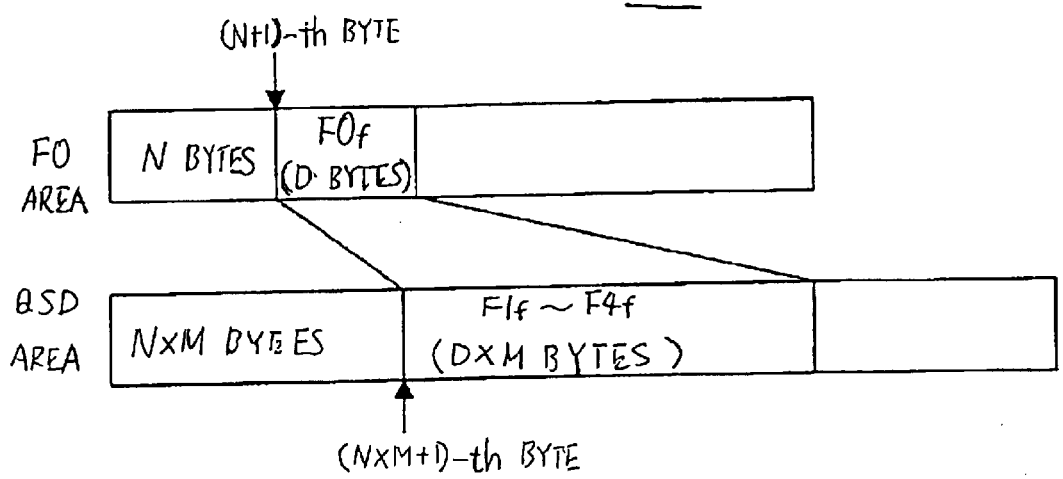
FIGS. 9 and 10 are diagrams showing a first storing scheme 20c and a second storing scheme 20d of storing a video object on a disc storage device.
Figure 10:
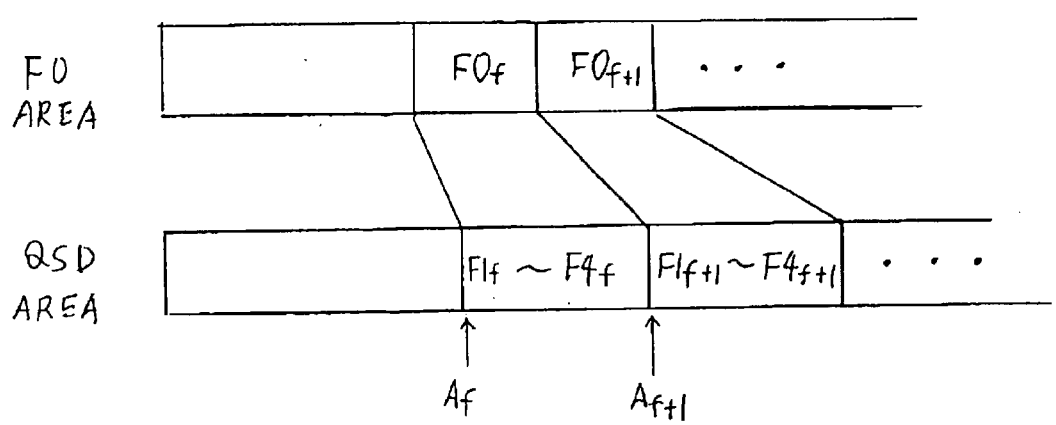

FIGS. 9 and 10 show a first storing scheme 20c and a second storing scheme 20d of storing a video object on the mass storage 20. The mass storage 20 may be any suitable disc storage device such as a hard disc, various optical discs, etc. The basic image data F0 and the quality supplement data (QSD) F1, F2, . . . are stored in two different areas: a F0 area and a QSD area on the third mass storage media.

In the first storing scheme 20c of FIG. 9, it is assumed that the quantity of the quality supplement data (QSD) F1$f$, F2$f$, F3$f$ and F4$f$ for each frame is M times the data quantity of the basic image data F0$f$ for the frame, where M is a positive constant. Then, if the first data of the basic image data F0$f$ is (N+1)-th byte in the F0 area, then in order to obtain the quality supplement data F1$f$, F2$f$, F3$f$ and F4$f$, the controller 40 has only to read the data of D*M bytes from the (N*M+1)-th byte in the QSD area. D is the data size of the basic image data for each frame.

Figure 11:
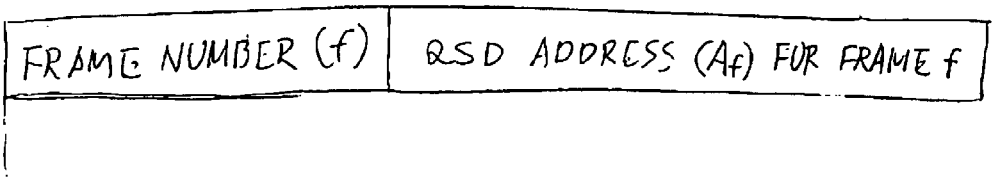
FIG. 11 is a diagram showing an address table used in the second storing scheme 20d of FIG. 10.

In the second storing scheme 20d of FIG. 10, the basic image data F0$f$ and the total quality supplement data F1$f$+F2$f$+F3$f$+F4$f$ may have arbitrary sizes. The start address of the total quality supplement data for an f-th frame in the QSD area is assumed to be A$f$. In order to know the quality supplement data address A$f$ from the frame number f, the controller 10 uses an address table of FIG. 11. The address table of FIG. 11 comprises a frame number (f) field and a field of QSD address (A$f$) for the frame number (f).

FIG. 12 shows a third storing scheme 20e of storing a video object on the mass storage 20. The mass storage 20 preferably comprises a suitable disc storage device such as a hard disc, various optical discs, etc. In this storing scheme 20e, the basic image data F0$f$ and the quality supplement data QSD$f$ (=F1$f$+F2$f$+ . . . ) are stored in a same area with the latter just following the former in a manner like F0$_{f-1}$, QSD$_{f-1}$, F0$_f$, QSD$_f$, F0$_{f+1}$, QSD$_{f+1}$ and so on. In this case, in normal play step 150 of FIG. 6, the controller 10 reads only the basic image data skipping the quality supplement data as shown by arrows above the strip area representative of the stored video data in FIG. 12. In the image quality enhancing operation in step 146, the controller 10 reads the quality supplement data QSD$f$ for the frame identified by the register 501 value as shown by an arrow below the strip area representative of the stored video data in FIG. 12.

Progressive JPEG Format

The invention is applicable to video data of formats in which some of the frames are described by using differential data between frames: e.g., the progressive JPEG format, the H. 263 format, MPEG-1 format and the MPEG-2 format. FIG. 13 is a diagram showing a data structure obtained when a progressive JPEG video object is stored in the third storing scheme 20e as shown in FIG. 12. In FIG. 13, the basic image data F0$f$ for each frame comprises a header F0H$f$ and a basic image data portion F0D$f$. The quality supplement data QSD$f$ comprises a first level differential data F1$f$, a second level differential data F2$f$, . . . , and an L-th level differential data FL$f$.

In case of the progressive JPEG format, in normal play step 150 of FIG. 6, the controller 10 reads only the header F0H$f$ and the basic image data F0D$f$ skipping the quality supplement data QSD$f$ (=F1$f$, F2$f$, . . . , and FL$f$) for each frame f. In the image quality enhancing operation in step 146, the controller 10 reads the quality supplement data QSD$f$ for the frame identified by the register 501 value.

It is noted that the controller 50 passes the frame data to be displayed to the video & audio decoder 60 of FIG. 1 in playing operations of steps 126, 128, 130 and 150. In case of the progressive JPEG format, the video & audio decoder 60 includes a JPEG decoder.

H. 263 Format

Figure 14:
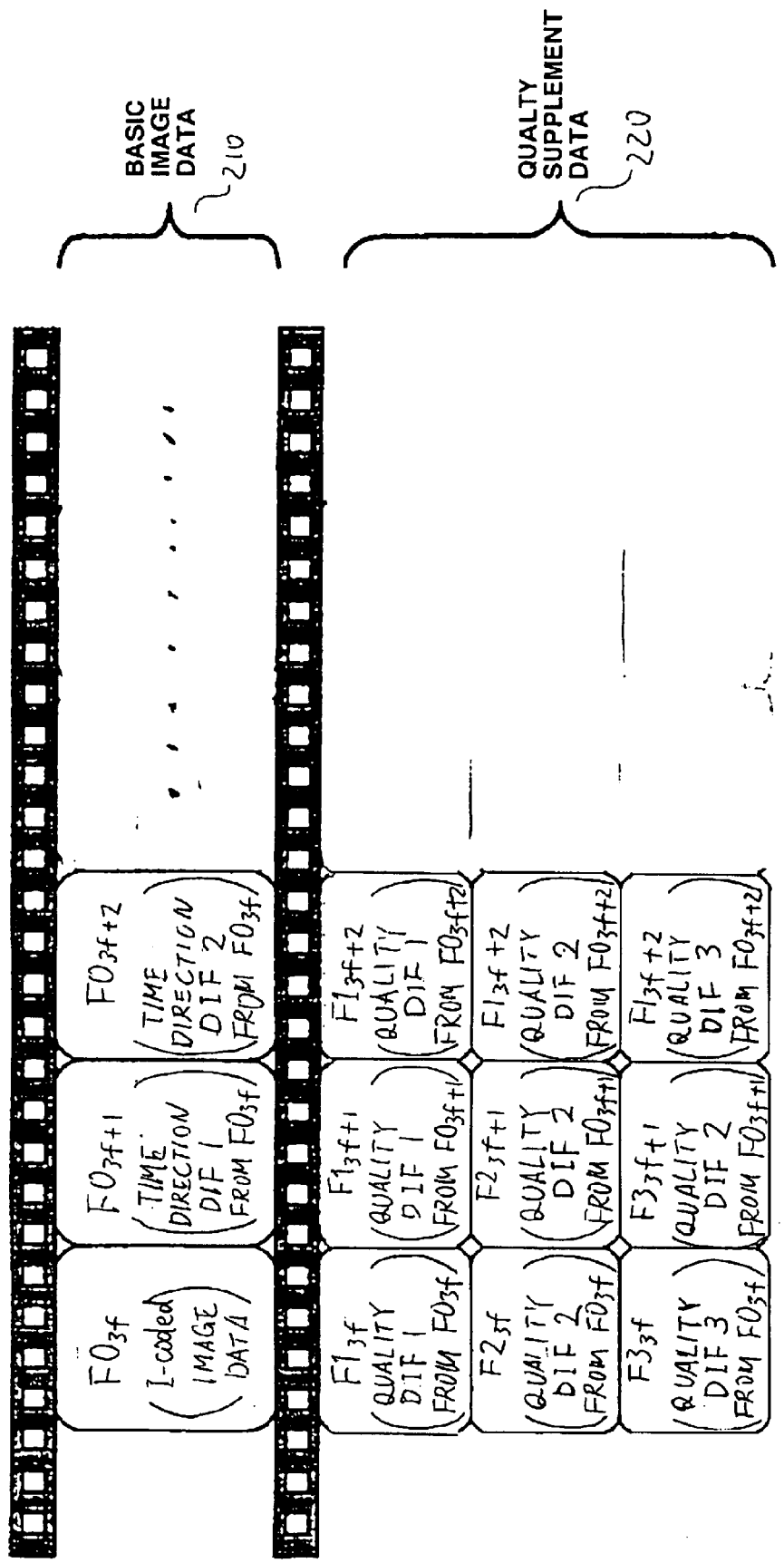
FIG. 14 is a diagram conceptually showing the H. 263 video format.

FIG. 14 is a diagram conceptually showing the H. 263 video format. In FIG. 14, an H. 263 video data comprises basic image data 210 for use in a play operation and quality supplement data 220 for use in a quality enhancing operation. If the frame data for the basic image data are expressed as F0$_0$, F0$_1$, F0$_2$, . . . , F0$g$, . . . , and F0$_{3N+2}$ (g is a frame number) then the frame data can be expressed as (F0$_{3f}$, F0$_{3f+1}$, F0$_{3f+2}$: f=0, 1, . . . N). In this case, the basic image frames identified by F0$_{3f}$ are intra-coded frames that can be decoded alone without the need of data of any other frame. On the other hand, the basic image frames identified by F0$_{f3+1}$ and F0$_{f3+2}$ are first and second differences, in the time direction, from the basic image data F0$_{3f}$ which needs frame F0$_{3f}$ data for decoding. The first and second differences are written as TIME DIRECTION DIF 1 and 2, respectively in FIG. 14. The quality supplement data for the frame 3$f$ comprises first, second and third differences, in the quality direction, from the basic image data F0$_{3f}$, which differences are referred to as "QUALITY DIFs 1, 2 and 3" and labeled "F1$_{3f}$", "F2$_{3f}$" and "F3$_{3f}$", respectively. In a similarly manner, the quality supplement data for the frame 3$f$+1 comprises QUALITY DIFs 1, 2 and 3 from the basic image data F0$_{3f+1}$ which differences are labeled "F1$_{3f+1}$", "F2$_{3f+1}$" and "F3$_{3f+1}$", respectively. Also, the quality supplement data for the frame 3$f$+2 comprises QUALITY DIFs 1, 2 and 3 from the basic image data F0$_{3f}$+2 which differences are labeled "F1$_{3f}$+2", "F2$_{3f}$+2" and "F3$_{3f}$+2", respectively.

Figure 15:
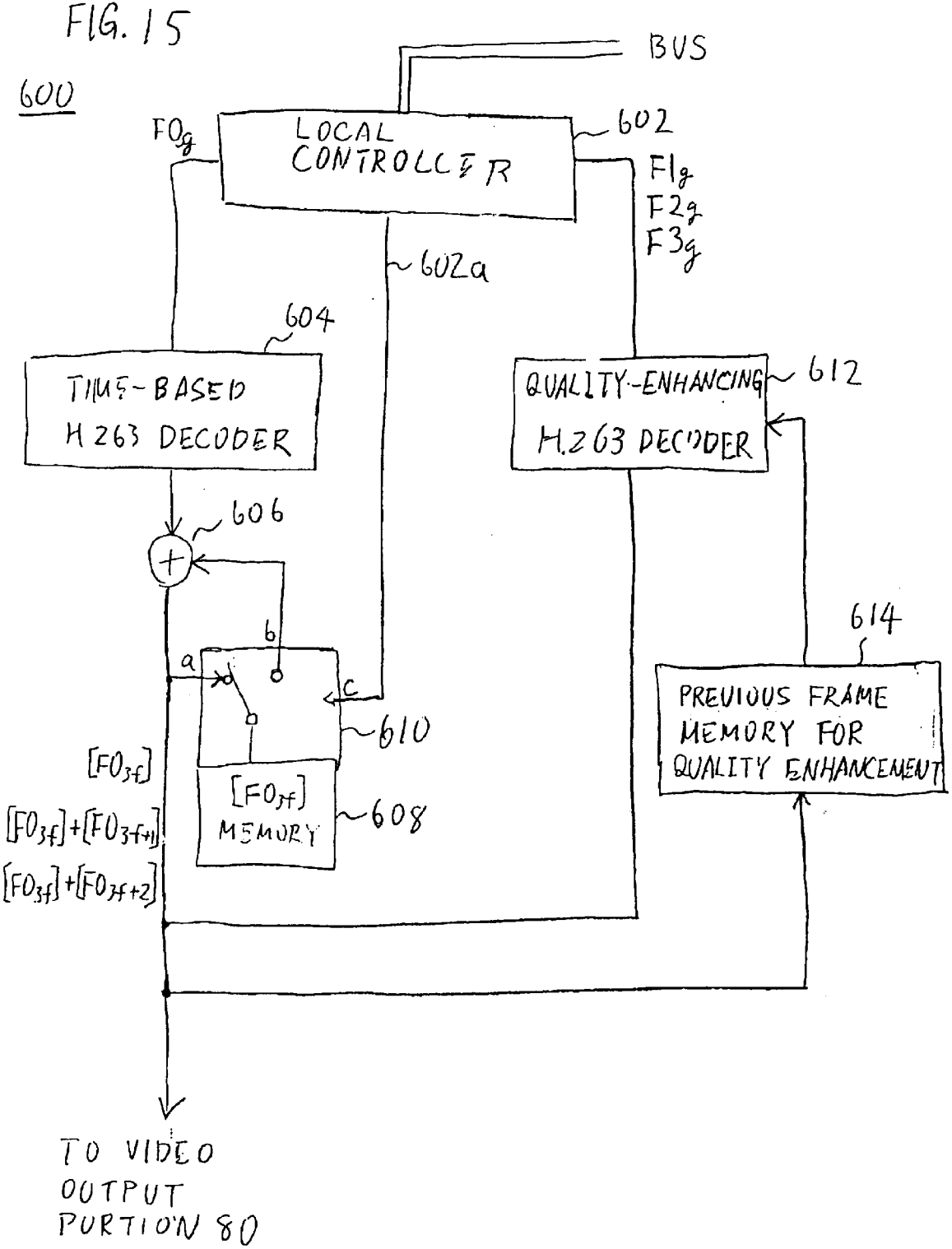
FIG. 15 is a schematic block diagram showing an exemplary arrangement of a video decoder 600 which is included in the video & audio decoder 60 of FIG. 1 and which is adapted to decode a video object of the H. 263 format as shown in FIG. 14.

FIG. 15 is a schematic block diagram showing an exemplary arrangement of a video decoder 600 which is included in the video & audio decoder 60 of FIG. 1 and which is adapted to decode a video object of the H. 263 format as shown in FIG. 14. In FIG. 15, the video decoder 600 comprises a local controller 602 for controlling the operation of the decoder 600; a time-based H. 263 decoder 604; an adder 606; a frame memory 608 for storing a I-coded image data F0$_{3f}$, a memory interface 610 for the memory 608; a quality-enhancing H. 263 decoder 612 for decoding quality supplement data F1$g$, F2$g$ and F3$g$ to provide a quality-enhanced frame data F0$g$+F1$g$+F2$g$+F3$g$; and a previous frame memory for quality enhancement.

The received video data is passed to the video & audio decider 60 and to the video decoder 600 or the local controller 602 through the bus lines 51. If the received video data is basic image data F0$g$, then the local controller 602 passes the data F0$g$ to the time-based H. 263 decider 604. If the received video data is quality supplement data F1$g$, F2$g$ or F3$g$, then the local controller 602 passes the data F1$g$, F2$g$ or F3$g$ to the quality-enhancing H. 263 decider 612.

The local controller 602 supplies a control signal 602a to a memory interface 610 control input 610c. The control signal 602a controls the memory interface 610 such that the data on the interface 610 data input terminal 610a is stored in the memory 608 if the received video data is I-coded image data, i.e., g=3f. Thus, if the received video data is F0$_{3f}$, the decoded video data [F0$_{3f}$] is stored in the frame memory 608, where [A] represents a decoded version of data A.

The control signal 602a also controls the memory interface 610 such that the data stored in the frame memory 608, i.e., the decoded video data [F0$_3$] is read out to a memory interface 610 data output terminal 610b if the received video data is not I-coded image data, i.e., g≠3f. Thus, if the received video data is F0$_{3f+1}$ or F0$_{3f+2}$, the decoded video data [F0$_{3f+1}$] or [F0$_{3f+2}$] is added by the adder 606 to the decoded video data [F0$_{3f}$] read from the memory 608 to yield the added decoded video data [F0$_{3f}$]+[F0$_{3f+1}$] or [F0$_{3f}$]+[F0$_{3f+2}$], respectively, which is supplied to the video output portion 80 and the previous frame memory 614.

To the previous frame memory 614, there are also supplied the decoded video data from the quality-enhancing H.

263 decoder 612. The H. 263 decoder 612 decodes the quality supplement data F1g, F2g or F3g from the local controller 602, and adds the decoded data [F1g], [F2g] or [F3g] to the data from the previous frame memory 614 to provide the quality enhanced frame data to the video output portion 80.

It is noted that since the video decoder 600 has respective previous frame memories 608 and 614 and respective H. 263 decoders 604 and 612 for a decoding in the time axis direction and a decoding in the quality axis direction, it is possible to store data decoded in the time axis direction in both of the previous frame memory 608 and 614 and to store data decoded in the quality axis direction only in the memory 614 for the quality axis direction. This reason, even if quality supplement data for a frame data F0g has been decoded, it is possible to resume the play of video data from the frame data F0g.

Though the above-described video decoder 600 has used two H. 263 decoders, an equivalent video decoder may be implemented by using a single decoder.

A video decoder that decodes a video object of a format using a correlation between frames not only in the time axis direction but also in the quality axis direction has been described in conjunction with the H. 263 video format. However, such a video decoder can be realized for other such video format; as MPEG format by replacing the H. 263 decoder(s) with a corresponding video decoder such as an MPEG decoder.

Though the above-described embodiments has dealt with a single media program, i.e., a video object, the following embodiment deals with a multimedia program.

Embodiment II

A multimedia-on-demand system according to a second illustrative embodiment of the invention has a feature of enhancing the picture quality of the first frame to be displayed after the execution of a stop command or the execution of a JF, JB or HS command issued during a stop state by transmitting quality supplement data from the server 1.

FIG. 16 is a diagram showing an exemplary scenario data table of a multimedia program available in a multimedia-on-demand system according to a second illustrative embodiment of the invention. In FIG. 16, the scenario data table contains a record for each of the multimedia objects used in the multimedia program for which the scenario data table is intended. Each record of the scenario data table comprises the fields of the object ID, the kind of the object, the display position on a screen, the display size, the presentation start time and the presentation end time. For the sake of better understanding, in the presentation start and end time fields, there is included corresponding value of the scenario time counter 501, Ct. In this specific example, the frame rate of the video objects is assumed to be 30 frames per second.

In order to simplify the operation, it is preferable to create an active object table as shown in FIG. 17 from the scenario data table. In FIG. 17, all of the Ct values found in the presentation start and end time fields of the scenario data table are listed in the ascending order in the first column or fields of the event list table. For each of the listed Ct values, there are listed, in the second field, the object IDs of multimedia objects the presentation of which is started or ongoing at the Ct value. However, each second field does not include the object the presentation of which ends at the Ct values.

Figure 18:
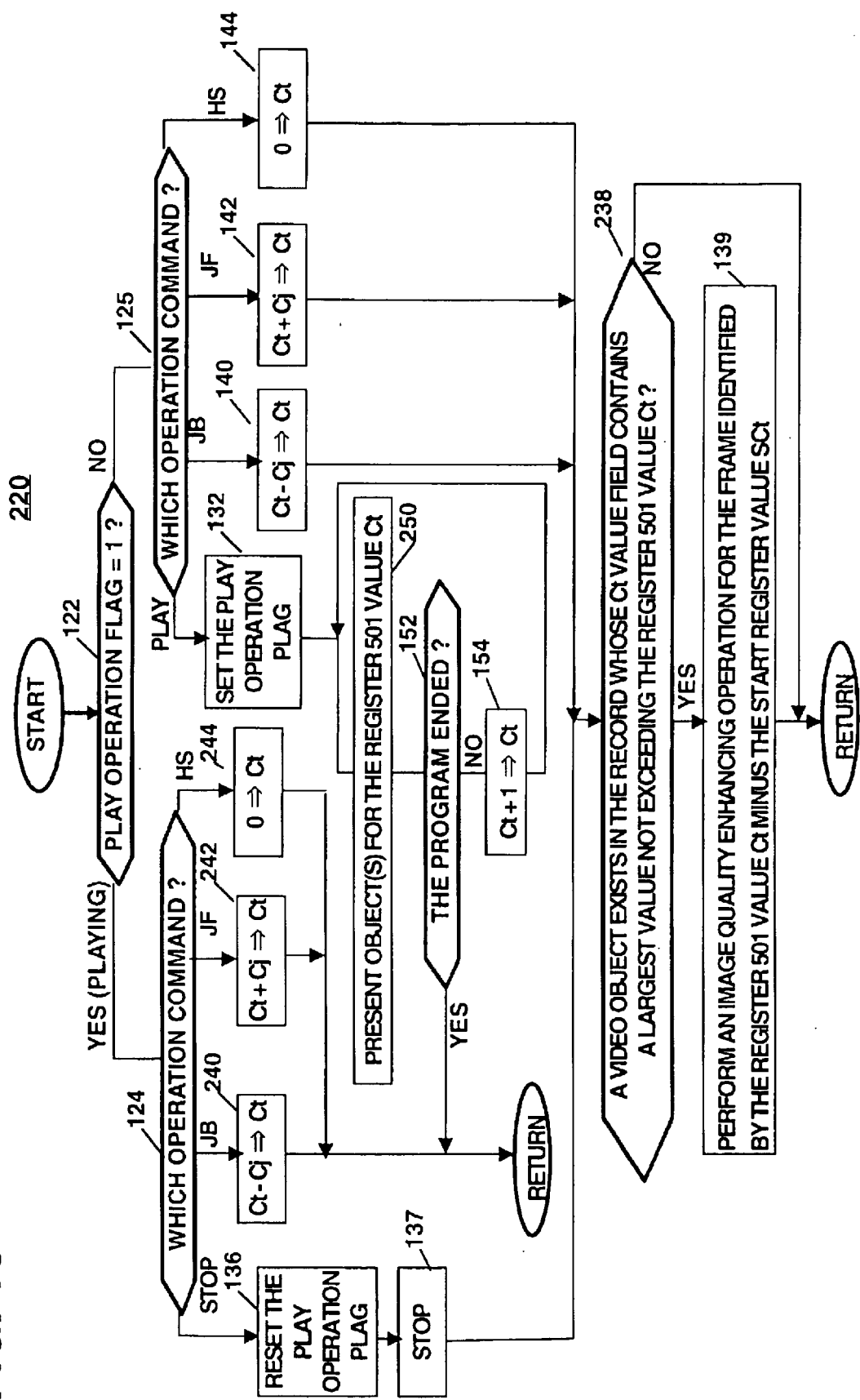
FIG. 18 is a flowchart showing an operation of an interrupt subroutine called from a main program in response to an interrupt caused by the user at the client terminal 3 pressing one of the presentation control buttons of FIG. 3 after specifying one of the available multimedia programs stored in the mass storage 20.

FIG. 18 is a flowchart showing an operation executed by the controller 50 of the client terminal 3 under the control of an interrupt subroutine called from a main program in response to an interrupt caused by the user at the client terminal 3 pressing one of the presentation control buttons of FIG. 3 after specifying one of the available multimedia programs stored in the mass storage 20. Since the operation 220 of FIG. 18 is very similarly to that of FIG. 6, only the difference between them will be described in the following.

If JB, JF or HS command is detected in step 124, then instead of executing a JB play step 126, a JF play step 128 or a HS play step 130, the controller 50 sets the register 501 value Ct to Ct−Cj, Ct+Cj or 0 in a JB step 240, a JF step 242 or a HS step 244, respectively; and returns to the main program to resumes the normal play operation of the current program from the register 501.

In step 250 of the normal play operation comprising steps 250, 152 and 154, the controller 50 presents relevant object(s) referring to the active object table of FIG. 17. Specifically, if the current value Ct is found in any Ct field of the table, the controller 50 continues the presentation of the object(s) which is (or are) listed in both the current record whose Ct field contains the current Ct value and the just above records in the table; ceases the presentation of the object(s) which is (or are) found in the just above record but not found in the current record, and starts the presentation of the object(s) which first appears (or appear) in the current record. If the current value Ct is not found in any Ct field of the active object table, the controller 50 has only to repeat the same operation as executed for the last Ct value.

In a manner well known in the art. In this case, if a video frame is to be displayed, the controller 50 only uses basic data for the frame.

After step 137, 140, 142 or 144, the controller 50 makes a test in step 238 to see if a video object exists in the record whose Ct value filed contains a largest value not exceeding the value of the scenario time register 501, Ct. If so, the controller 50 performs the image enhancing operation for the frame identified by the current register 501 value Ct minus the register 501 value of the presentation start time SCt of the video object in step 139. This is because the current register value Ct equals the sum of the presentation start time Ct value SCt and the frame number of the video object.

After step 139, the controller 50 ends the operation 220. If the test result is NO in step 238, then the controller 50 ends the operation 220.

As described above, the image enhancing operation of step 139 enhances the picture quality of the frame to be displayed after the execution of a stop command or the execution of a JF, JB or HS command issued during a stop state.

It should be noted that the image enhancing operation may be performed for a plurality of frames beginning the frame identified by the value of Ct−SCt.

Embodiment III

Figure 19:
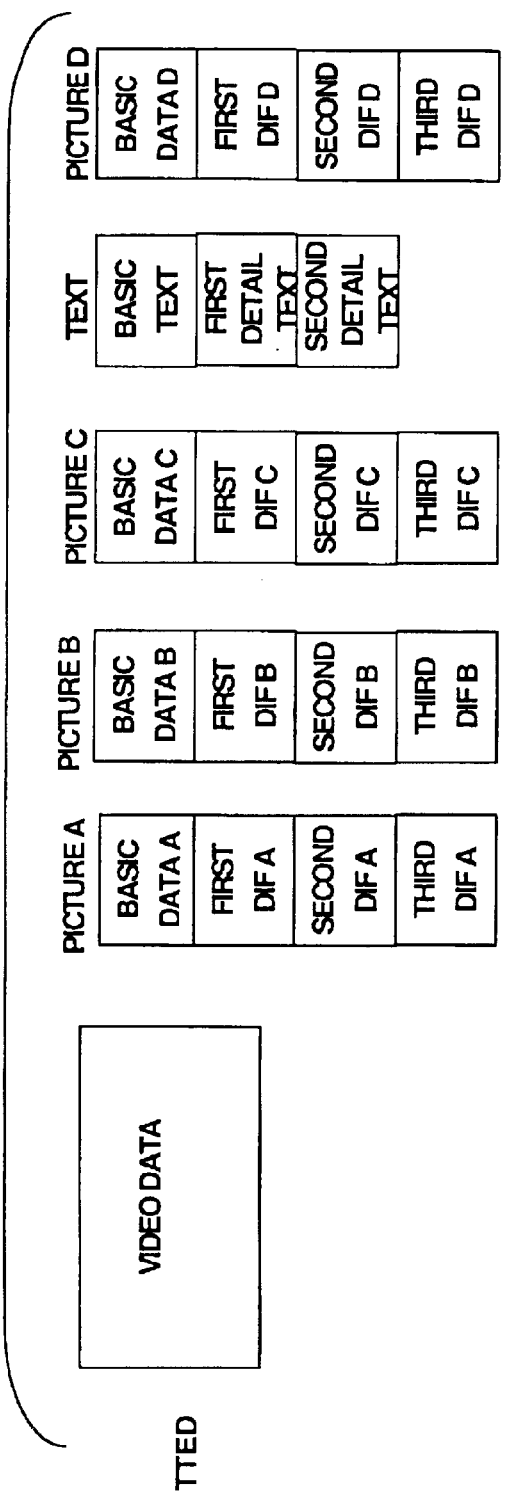
FIG. 19 is a diagram showing various variable-quality objects used in an exemplary multimedia program available in the inventive multimedia-on-demand system.
Figure 20:
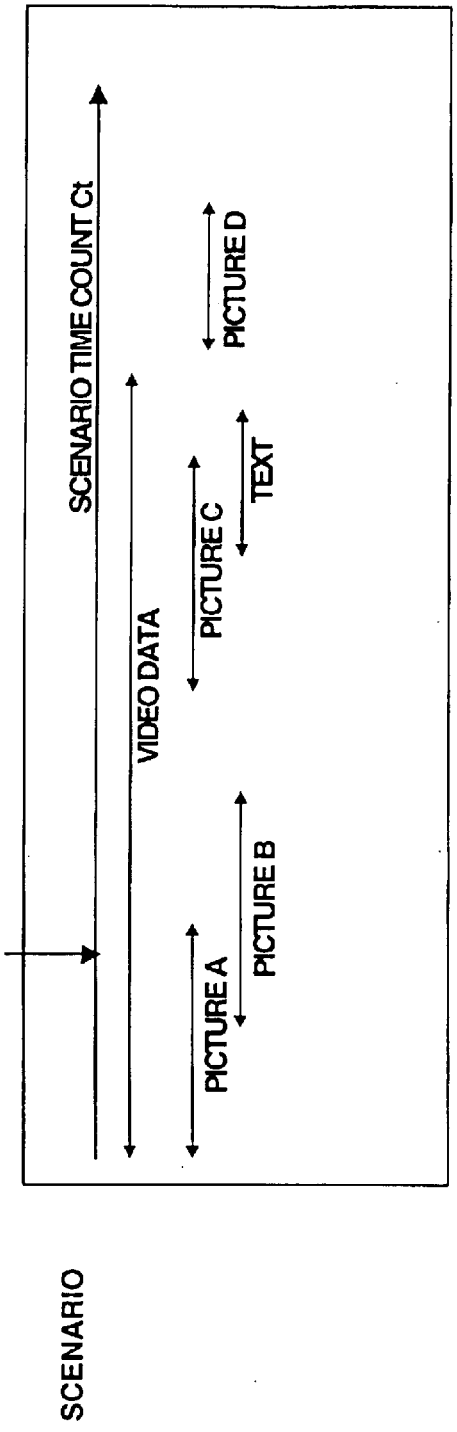
FIG. 20 is a diagram showing how the multimedia objects of FIG. 19 are presented in the exemplary multimedia program.
Figure 21:
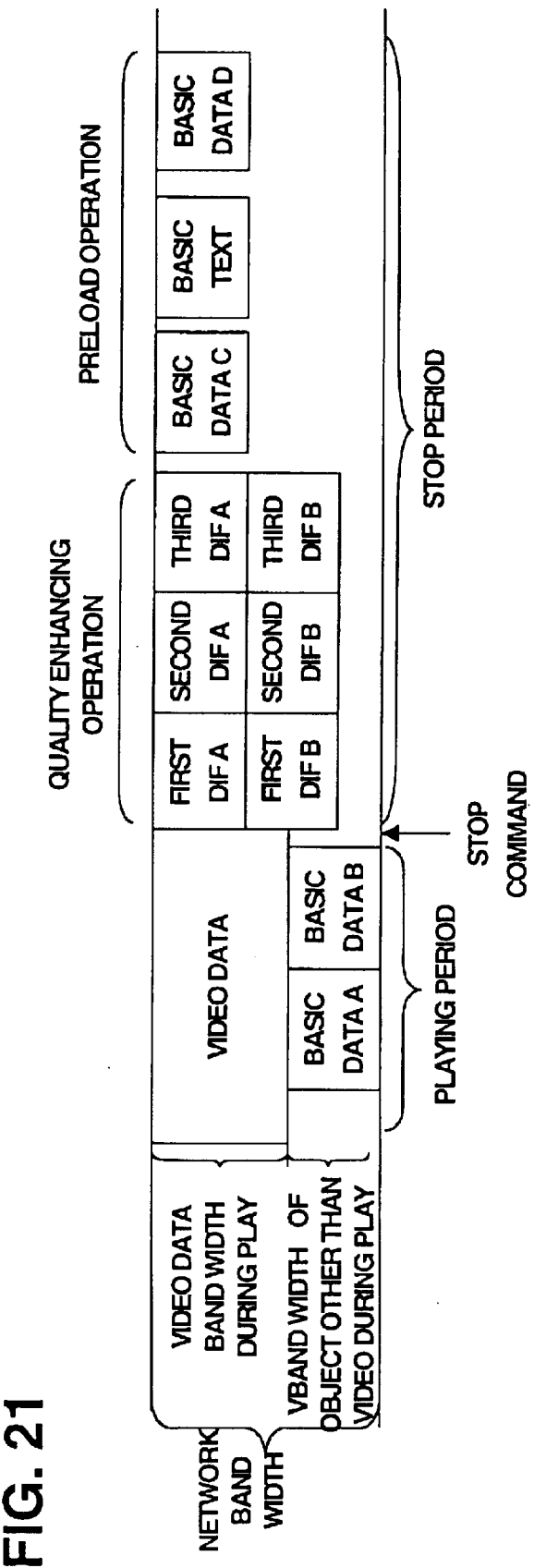
FIG. 21 is a diagram showing a way of transmitting the multimedia objects to present the objects as shown in FIG. 20.

According to a third illustrative embodiment of the invention, a multimedia-on-demand system adds detailed information to (or enhances the quality of) each of variable-quality objects during a stop period in a manner as illustrated by a part labeled "QUALITY ENHANCING OPERATION" in FIG. 21. A variable-quality object is a multimedia object that comprises a plurality of detail levels of data and that permits an enhancement of the presentation quality by adding a higher detail level of data. The above-mentioned progressive JPEG video is one of such variable-quality objects. FIG. 19 is a diagram showing examples of variable-quality objects. In FIG. 19, still pictures A, B, C and D are variable in the display quality according to the difference data levels used for presentation. Also, the text object of FIG. 19 is said to be a variable—quality object since the text object comprises a plurality of detail levels of data.

Also, the client terminal of the multimedia-on-demand system tries to collect as much object data as possible in advance during a stop period so that a random access operation such as a JF operation can be promptly executed. This collection operation is shown by a part labeled "PRE-LOAD OPERATION" again in FIG. 21.

Figure 22:
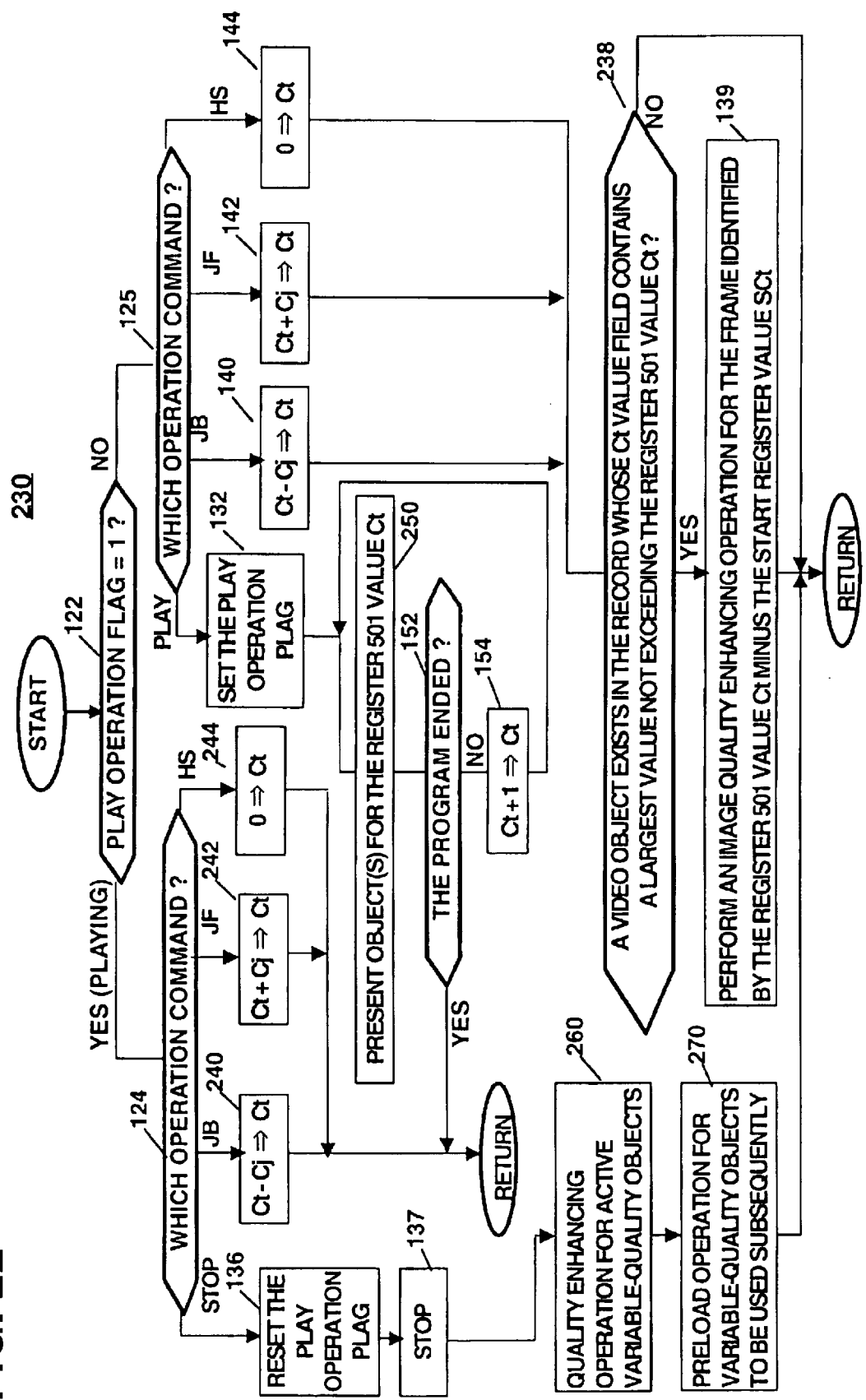
FIG. 22 is a flowchart showing an operation of an interrupt subroutine called in response to a pressing of one of the presentation control buttons of FIG. 3 according to the third embodiment of the invention.

FIG. 22 is a flowchart showing an operation of an interrupt subroutine 230 called in response to a pressing of one of the presentation control buttons of FIG. 3 according to the third embodiment of the invention. The interrupt subroutine 230 is identical to that of FIG. 18 except that after step 137, the controller 50 executes steps 260 and 270 instead of proceeding to step 238.

In step 260, the controller 50 performs an image quality enhancing operation for at least one frame beginning the frame identified by the value of Ct–SCt for each of the active variable-quality objects. For this purpose, it is preferable to add an field 265 for containing a variable-quality flag indicative of whether the objet is variable in presentation quality or a loading priority code indicative of the priority order of the object in a load operation as shown in FIG. 23. If there are a plurality of active objects with an identical priority code, the controller 50 preferably processes the objects in order of presentation.

Also, it is preferable to keep a load flag for each object as shown in FIG. 24. The load flag for an object indicates whether the basic data of the object has been loaded or not. The load flags are all reset in an initial operation.

In step 270, the controller 50 preferably tries to load basic data of as many object to be subsequently presented as possible in advance. In order to distinguish the loaded object from not-loaded ones, the controller 50 sets the load flag each time the load operation of the basic data of an object has been completed. This enables a quick response in a random access operation such as a fast ford operation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of presenting, at a client terminal, a multimedia program stored on a server wherein the multimedia program includes a video object, each frame of the video object comprising a basic data portion and at least one level of detailed data portions, the method comprising the steps of:
   in response to one of play control commands from a user, determining a time count in said multimedia program according to one of said play control commands, said play control commands including a play, a stop, a head search, a jump forward and a jump backward command;
   in response to one of said head search, said jump forward and said jump backward commands issued during a stop period, determining whether there is a video object to be displayed at said time count in said multimedia program; and
   in the event there is said video object to be displayed at said time count in said multimedia program, obtaining said at least one level of quality supplement data portions for a first frame to be displayed in the next play operation for displaying a quality-enhanced version of said first frame to be displayed.

2. A method as defined in claim 1, further comprising the steps, executed by said client terminal, of:
   in response to said stop command, determining whether there is a video object to be displayed at said time count in said multimedia program, and
   in the event there is said video object to be displayed at said time count, obtaining said at least one level of quality supplement data portions for a first frame to be displayed in a next play operation for displaying a quality enhanced version of said first frame to be displayed.

3. A method as defined in claim 1, further comprising the steps o, executed by said client terminal, of in response to said stop command testing to determine if there are multimedia objects which are other than video objects and each comprise a basic data and quality supplement data and which are displayed at said time count in said multimedia program; and for each said found multimedia objects, obtaining said quality supplement data for displaying a quality enhanced version of said each object.

4. A method as defined in claim 3, further comprising the steps, executed by said client terminal, of in response to said stop command, testing to determine if there are-multimedia objects other than video objects and each comprise basic data and quality supplement data and which are to be displayed later, and for each of said found multimedia objects, obtaining said basic data in advance.

5. A method as defined in claim 3, further comprising the steps, executed by said client terminal, of in response to said stop command, determining if there are multimedia objects which are other than video objects, which comprise basic data and quality supplement data and which are adapted to be displayed at a later time, and for each of said found multimedia objects, obtaining said basic data in advance.

6. A terminal for presenting a multimedia program stored in a remote server linked therewith via a band-limited transmission path wherein the multimedia program includes a video object, each frame of the video object comprising a basic data portion and at least one level of detailed data portions, the terminal comprising:
   means, responsive to one of play control commands from a user, for determining a time count in said multimedia program according to said one of said play control commands, said play control commands including a play, a stop, a head search, a jump forward and a jump backward command;
   means, responsive to one of said head search, said jump forward and said jump backward commands issued during a stop period, for determining whether there is a video object to be displayed at said time count in said multimedia program; and
   means, operative in the event there is said video object to be displayed at said time count in said multimedia program, for obtaining said at least one level of quality supplement data portions for a first frame to be displayed in a next play operation for displaying a quality enhanced version of said first frame to be displayed.

7. A terminal as defined in claim 6, further comprising:
   means responsive to said stop command, for determining whether there is a video object to be displayed at said time count in said multimedia program; and
   means, operative in the event there is said video object to be displayed at said time count, for obtaining said at least one level of quality supplement data portions for a first frame to be displayed in a next play operation for displaying a quality enhanced version of said first frame to be displayed.

8. A terminal as defined in claim 6, further comprising means responsive to said stop command, for finding-multimedia objects which are other than video objects, wherein each comprises basic data and quality supplement data and which are adapted to be displayed at said time count in said multimedia program, and means, operative for each of said found multimedia objects, for obtaining said quality supplement data for displaying a quality enhanced version of said each object.

9. A terminal as defined in claim 6, further comprising:
means, responsive to said stop command, for finding multimedia objects that are other than video objects, wherein each comprises basic data and quality supplement data and that are to be displayed later; and
means, operative for each of said found multimedia objects, for obtaining said basic data in advance.

10. A terminal as claimed in claim 8, further comprising:
means, responsive to said stop command, for finding at least one multimedia object that is other than a video objects and that comprise basic data and quality supplement data and that are to be displayed later, and
means, operative for each of said found multimedia objects for obtaining said basic data in advance.

11. A server for sending a video program to a plurality of client terminals, the server comprising:
means for preparing a basic data portion and a plurality of levels of quality supplement data for each frame of the video program;
means far storing the basic data portions for the frames of the video program on a tape recording medium;
means for storing pieces of quality supplement data of each level for the frames of the video program on a different tape recording medium, wherein the quality of the video program at each frame that is played by a combination of the basic data portion and each level of quality supplement data is higher than that played by using only the basic data portion;
means for rotating all of the tape recording media synchronously in any of a play operation, a head search operation, a jump forward operation and a jump backward operation; and
means, responsive to a quality supplement data request from a client terminal, for reading the levels of quality supplement data of a last displayed frame while synchronously rotating the tape recording media, and sending the levels of quality supplement data to the client terminal one by one to add each level of quality supplement data to the basic data portion of the last displayed frame and to gradually increase the quality of the video program at the last displayed frame played by a combination of the basic data portion and one level of quality supplement data.

12. A server for sending a video program to a plurality of client terminals, the server comprising:
means for storing a plurality of basic data portions for frames of the video program on a first tape recording medium;
means for storing a plurality of quality supplement data portions for the frames of the video program on a second tape recording medium, wherein the quality of the video program at each frame played by a combination of the basic data portion and the quality supplement data portion is higher than that played by using only the basic data portion;
means for rotating both of the first and second tape recording media synchronously in any of a play operation, a head search operation, a jump forward operation and a jump backward operation; and
means, responsive to a quality supplement data request from each client terminal, for reading the quality supplement data portion of a last displayed frame while synchronously rotating the first and second tape recording media and sending the quality supplement data portion to the client terminal to add the quality supplement data portion to the basic data portion of the last displayed frame and to heighten a quality of the video program at the last displayed frame.

13. A server as defined in claim 12 wherein said supplement data portion comprises a plurality of levels of quality supplement data, and each level of quality supplement data is used in sequence to gradually increase the quality of the video program at the last displayed frame played by a combination of the basic data portion and the level of quality supplement data.

* * * * *